Sept. 7, 1965   J. WALSH   3,204,679

FASTENERS FOR SHEET MATERIAL OR THE LIKE

Filed Feb. 19, 1963

Inventor:
John Walsh
By Kenneth W. Forbes
attorney 3,204,679
FASTENERS FOR SHEET MATERIAL OR
THE LIKE
John Walsh, Harrow Weald, England, assignor to John Walsh & Co. Limited, Middlesex, England, a British company
Filed Feb. 19, 1963, Ser. No. 259,696
Claims priority, application Great Britain, Mar. 2, 1962, 8,269/62
3 Claims. (Cl. 151—41.72)

This invention relates to fastening devices or anchorages for the attachment or connection of components to inextensible sheet material such as sheet metal or relatively thin flat flanges or webs on bodies of more complex form, all of which will be regarded, for the purposes of the present specification, as inextensible sheet material.

The invention is primarily concerned with the provision of a normally fixed fastening device or anchorage, of the kind commonly referred to as a "captive nut" for the bolting or screwing of items of mechanical or electrical equipment to sheet metal such as casings, chassis, partitions, and so on, and has for an object to provide a simple and effective device which, when secured in position, has a high resistance to torsional loading, as when a screw is threaded thereinto and tightened.

According to the present invention, a fastening device or anchorage for facilitating the attachment of articles to substantially inextensible sheet material is of generally cylindrical form and has a head or flange at one end and an integral coaxial hollow shank or skirt adapted to be passed through a hole in the said sheet of less diameter than the head. The head is adapted to engage one surface of the sheet around the hole, and has small projections on its underside adapted to bite into the surface of the sheet, whilst the skirt is externally roughened and is adapted to be riveted or peened over into tight contact with the other surface around the hole.

The fastening device may be internally threaded to constitute a nut, and its head may be grooved or knurled around its periphery in such a way that the grooves, or the troughs of the knurling, break through the underside of the head, and the material of the head is deformed or upset at these points to form small and relatively sharp projections.

Preferably, the roughening of the external surface of the hollow shank or skirt is constituted by grooves or knurling in a generally axial direction.

One practical embodiment of the invention will now be particularly described, by way of example only, with reference to the acompanying drawings, in which—

Figure 1:
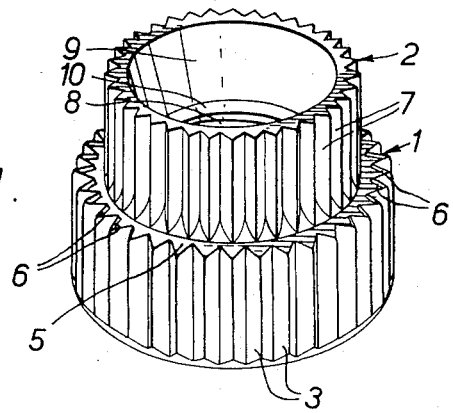
Figure 2:
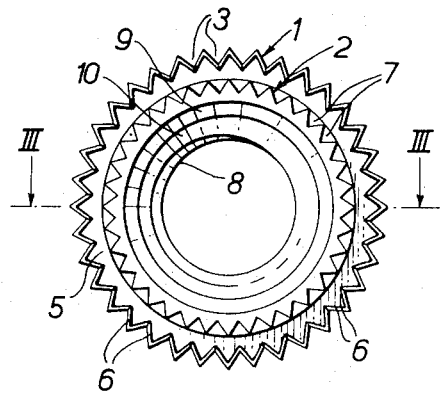
Figure 3:
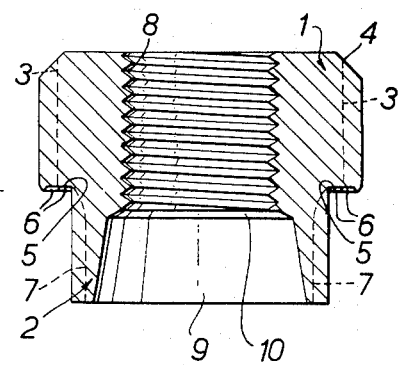
Figure 4:
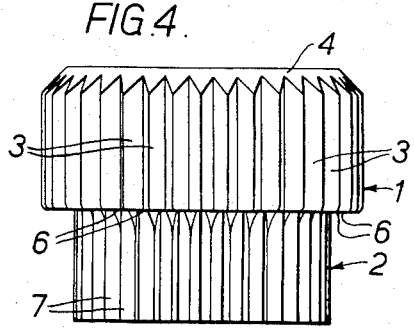
Figure 5:
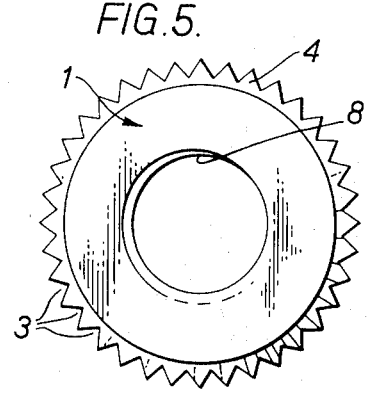

FIGURE 1 is a perspective view of a fastener;
FIGURE 2 is an under-plan view;
FIGURE 3 is a sectional elevation, and
FIGURES 4 and 5 are side and plan views, respectively.

The device illustrated is of generally tubular construction, and has a relatively deep head 1 integral with a smaller diameter skirt 2 of a length sufficient to pass through a sheet or thin web and be peened or riveted over to lock onto the sheet. The head is milled or knurled around its cylindrical periphery to form a series of grooves 3 which break through a chamfered surface 4 at the outer end of the head and a generally plane under-surface or flange 5 at the junction of the head 1 and the skirt 2. Where each groove 3 breaks through this flange 5, the metal of the head 1 is deformed or upset to form a sharp V-shaped projection 6 which meets each adjacent V to form a shallow wavy ridge or wall following the outline of the ends of the serrations produced by the milling or knurling, and which is capable of biting into the surface of a sheet or thin web when the head 1 is forced tightly into contact with it under the axial loading produced by the peening or riveting action. Many V-shaped projections 6 are thus formed all round the rim of the head, and these serve to increase the locking action of the fastening device against rotation under torsional stress during use, because each flank of each V lies at an angle to the tangent to the circumscribing circle through the crests of the serrations 3.

The skirt 2 is similarly knurled at 7, the knurling producing grooves and ridges which extend generally parallel to the axis of the fastening device.

The bore of the fastener is threaded at 8 for approximately the full depth of the head 1, and the portion 9 lying within the skirt 2 is of larger diameter than the root diameter of the thread 8 and is conveniently flared towards the free end of the skirt 2 as shown in FIGURE 3 of the drawings. The wall of the skirt 2 is sufficiently thin to be capable of peening or riveting over after it is passed through a hole in the sheet or thin web. In order to minimise the effects of the distortion produced by this peening on the thread 8, the bore portion 9 is separated from the thread 8 by an internal shoulder 10.

In use, the skirt portion 2 is passed through a hole of appropriate clearance diameter in a metal sheet or web and the skirt 2 is peened over. This forces the V-shaped projections 6 into the one surface of the sheet, and at the same time the ridges of the knurling 7 around the external wall of the skirt 2 bite into the other surface of the sheet. Both the projections 6 and the knurling 7 thus reinforce the ordinary frictional grip of the fastening device after peening over to resist torsional loads applied to the fastener during use—for example, when a fixing screw is tightened in the threads 8.

The material of the device must, of course, be at least as hard as that of the sheet or web to which it is to be affixed if the full benefit of the torsion-resisting action of the projections 6 and knurling 7 is to be used to its maximum capacity. On the other hand, the projections 6 and knurling 7 could, if desired, be replaced by other forms of surface roughness separately applied to the initially smooth under-surface 5 of the head and external wall of the skirt 2. For example, particles of hard sharp material such as aluminum oxide may be embedded where required in the surfaces of the head 1 and skirt 2.

Instead of being internally threaded as shown at 8, the bore through the fastening device may be splined or of non-circular shape to receive a complementarily formed peg or rod. Alternatively, it may be left plain so that the device can act as a journal bearing for a pin or spindle, or in a bush for the reception of a bolt and nut or a rivet.

If preferred, the head portion of the fastening device may be solid, and its outer peripheral surface formed so as to engage and retain the component required to be attached by the device. For example, after being grooved at 3 to form the projections 6, the head may then have a screw-thread or locking groove cut around it.

Comparative tests of fasteners according to the present invention and commercially available fasteners of the same general kind have demonstrated the increased efficiency of the former. Thus, fasteners according to the present invention were made out of 32-ton tensile steel and were riveted into mild steel sheet and brass sheet adjacent equivalent examples of similar commercially available fasteners. In the case of the mild steel sheet fasteners, those made in accordance with the present invention remained unmoved up to the shearing torque of the bolt, whereas the known commercial fasteners slipped before this torque was reached.

In the case of the brass sheet fasteners, those made in accordance with the present invention resisted torques much larger than those under which the known commercially available fasteners began to slip and rotate.

In both the above tests, the height of the V-shaped projections 6 was between 0.005 in. and 0.007 in.

I claim:

1. A fastening device for use with inextensible sheet material and adapted to be secured to said material by riveting or peening comprising
    a head portion,
    a hollow open ended skirt portion integral, co-axial with and of smaller diameter than said head portion,
    a shoulder at the junction of said head and skirt portions extending substantially perpendicular from said skirt portion against which the sheet material is clamped when riveted or peened,
    a substantially continuous substantially V-shaped ribbed depending flange with its lowest edge in substantially the same plane around the periphery of said head portion, formed by knurling on the circumference of the head portion at least at the outer periphery of said shoulder,
    and a knurled surface on the outer surface of said skirt portion located at least to engage the opposite side of the sheet material against which said shoulder clamps,
    said head portion having means additional to said knurled surface for connection to a torque-applying member.

2. A fastening device for use with inextensible sheet material and adapted to be secured in said material by riveting or peening comprising
    a head portion,
    a hollow open ended skirt portion integral, co-axial with and of smaller diameter than said head portion,
    a shoulder at the junction of said head and skirt portions extending substantially perpendicular from said skirt portion against which the sheet material is clamped when riveted or peened,
    a substantially continuous substantially V-shaped ribbed depending flange with its lowest edge in substantially the same plane around the periphery of said head portion formed by knurling on the circumference of the head portion at least at the outer periphery of said shoulder,
    and a knurled surface on the outer surface of said skirt portion at least adjacent the free end of said skirt portion located to engage the opposite side of the sheet material against which said shoulder clamps,
    said head portion having means additional to said knurled surface for connection to a torque-applying member.

3. A fastening device for use with inextensible sheet material and adapted to be secured in said material by riveting or peening comprising
    a head portion,
    a hollow open ended skirt portion integral, co-axial with and of smaller diameter than said head portion,
    said head portion and said skirt portion having a co-axially through bore threaded in said head portion and said bore through said skirt portion being of greater diameter than the route diameter of said thread,
    a shoulder at the junction of said head and skirt portions extending substantially perpendicular from said skirt portion against which the sheet material is clamped when riveted or peened,
    a substantially continuous substantially V-shaped ribbed depending flange with its lowest edge in substantially the same plane around the periphery of said head portion formed by knurling on the circumference of the head portion at least at the outer periphery of said shoulder,
    and a knurled surface on the outer surface of said skirt portion located at least to engage the opposite side of the sheet material against which said shoulder clamps.

References Cited by the Examiner

UNITED STATES PATENTS

| 1,714,520 | 5/29 | Sande | 151—41.73 |
| 2,026,757 | 1/36 | Swanstron | 151—41.72 |
| 2,136,523 | 11/38 | Rosenberg | 151—41.73 |
| 2,136,524 | 11/38 | Rosenberg | 151—35 |

FOREIGN PATENTS

| 370,948 | 4/32 | Great Britain. |
| 603,984 | 6/48 | Great Britain. |

EDWARD C. ALLEN, *Primary Examiner.*